United States Patent [19]

Debenham et al.

[11] Patent Number: 4,546,873
[45] Date of Patent: Oct. 15, 1985

[54] ARTICLE RETENTION SYSTEM FOR TRANSFER EQUIPMENT

[75] Inventors: Michael Debenham, Frankston; Alan G. Dalli, Warrandyte; Peter L. Revill, Middle Park, all of Australia

[73] Assignee: The Broken Hill Proprietary Company Limited, Melbourne, Australia

[21] Appl. No.: 658,061

[22] Filed: Oct. 4, 1984

Related U.S. Application Data

[63] Continuation of Ser. No. 376,773, May 10, 1982, abandoned.

[30] Foreign Application Priority Data

May 15, 1981 [AU] Australia .............................. PE8897

[51] Int. Cl.⁴ ............................................ B65G 15/58
[52] U.S. Cl. ...................................... 198/836; 72/405
[58] Field of Search ............... 198/836, 656, 628, 843, 198/842; 72/405

[56] References Cited

U.S. PATENT DOCUMENTS

| | | | |
|---|---|---|---|
| 1,555,867 | 10/1925 | Marshall | 198/843 |
| 2,439,189 | 4/1948 | Schafroth | 198/836 |
| 2,796,162 | 6/1957 | Bellingham | 198/836 |
| 2,816,645 | 12/1957 | Norin | 198/836 |
| 3,231,065 | 1/1966 | Kaminski et al. | 198/656 |
| 4,289,231 | 9/1981 | Kaminski | 198/842 |

Primary Examiner—Joseph E. Valenza
Assistant Examiner—Kyle E. Shane
Attorney, Agent, or Firm—Murray, Whisenhunt and Ferguson

[57] ABSTRACT

The specification discloses an article retention system for transfrer equipment, particularly transfer equipment for carrying can ends to a series of stations to produce an easy-opening end. The can ends are supported by an indexing belt and contact means in the form of spring steel strips and are arranged in overlying and contacting relationship with the can ends supported by the belt. A contacting force of between 200 to 500 grams is sufficient to retain the can ends in a predetermined orientation such that the ends are accurately presented to each station. In an alternative embodiment a fixed rail overlies the edges of the can ends and spring loaded rollers engage the indexing belt to force the can ends into engagement with the rails to maintain the orientation in a manner similar to the above.

3 Claims, 4 Drawing Figures

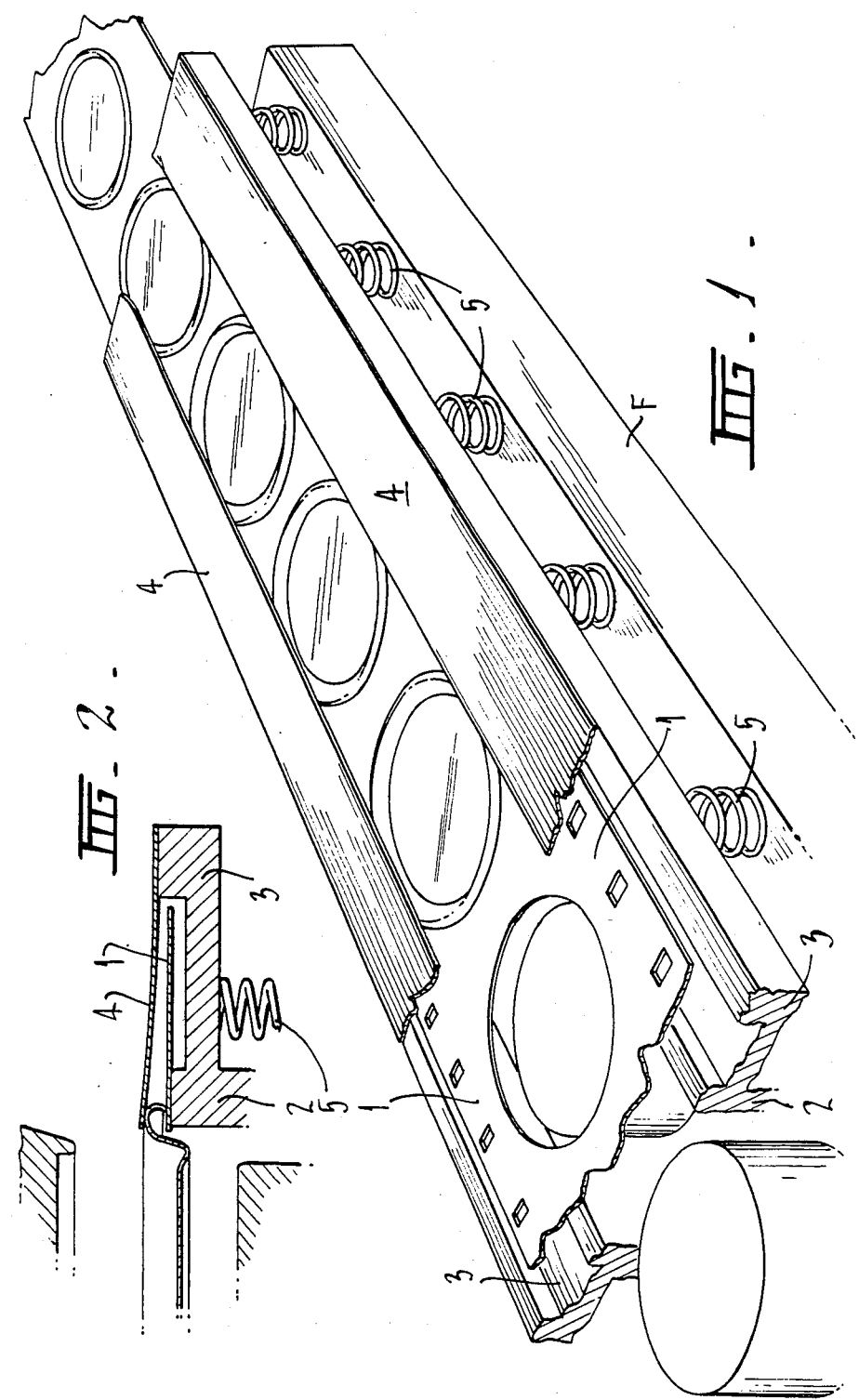

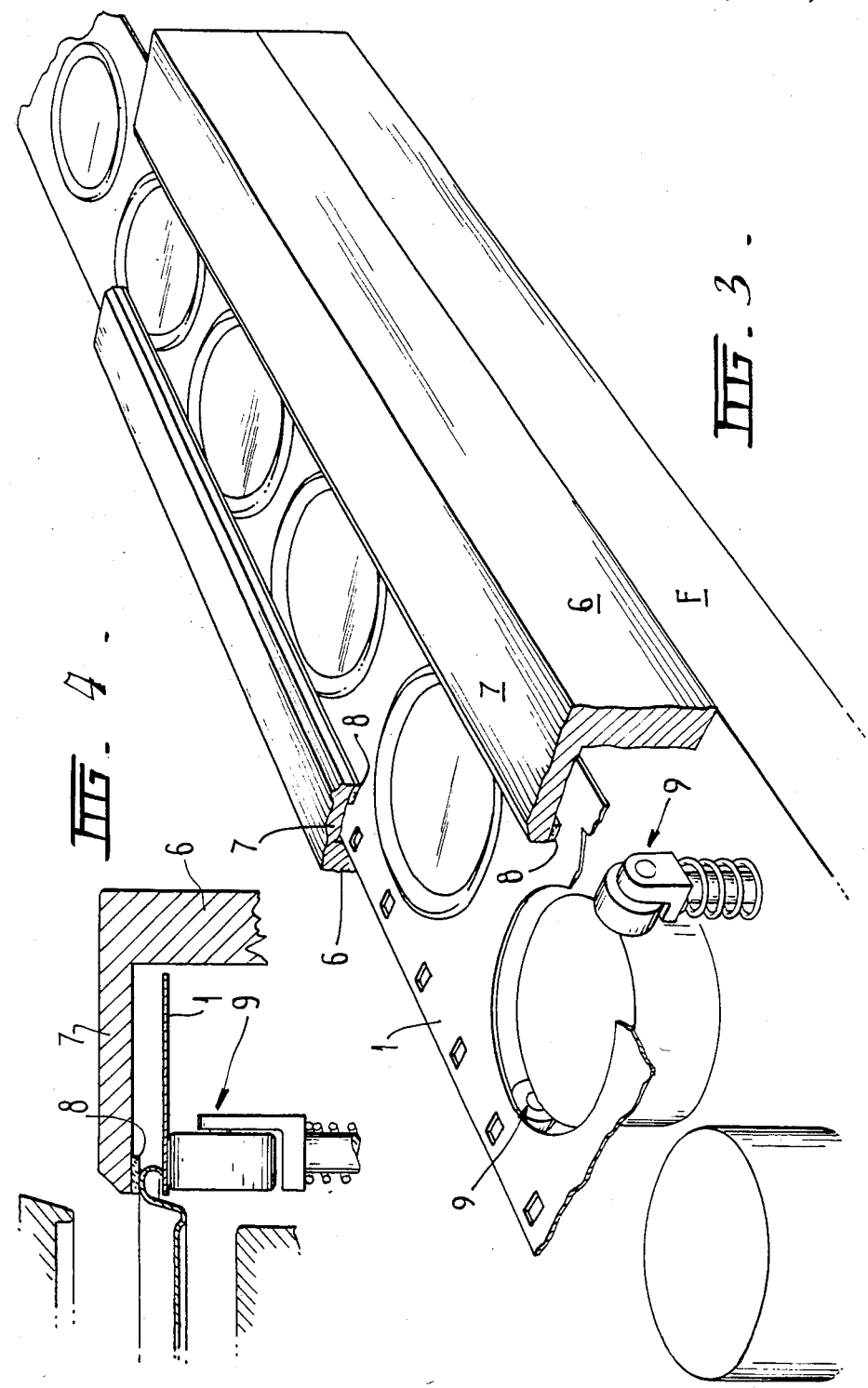

ARTICLE RETENTION SYSTEM FOR TRANSFER EQUIPMENT

This application is a continuation of application Ser. No. 376,773, filed May 10, 1982, now abandoned.

BACKGROUND OF THE INVENTION

This invention relates to an article retention system for transfer equipment in which the article is required to be maintained in a particular orientation for processing, treatment or other operations.

In the manufacture of easy-opening container ends, an end feeding apparatus is provided to feed the ends to each of a series of stations at which the various manufacturing operations are performed on the can ends to produce an easy-opening end. In one can end transferring apparatus manufactured by The Stolle Corporation an apertured indexing belt is used to support the can ends during the forming operations referred to above. Such an apparatus is described in greater detail in U.S. Pat. No. 3,231,065 Kaminski et al and in further detail in U.S. Pat. No. 4,213,324 Kelley et al.

In the manufacture of easy-opening can ends of either the "Ring-pull" or "Push-in" types, it is important that the can ends be maintained in a predetermined orientation throughout the various formation stages of the manufacturing process. Although magnetic means may be used to hold steel can ends in position on the belt, such a system is not suitable for aluminium can ends. Furthermore, magnetic devices are generally inconvenient as they tend to attract magnetic particles and are therefore difficult to maintain.

In an attempt to overcome the above problems, The Stolle Corporation developed a transfer system in which a negative air pressure was applied to a cavity under the indexing belt such that the ends were held in position on the belt by the atmospheric pressure acting on the tops of the ends. Such an arrangement is not entirely suitable for can ends having push-in closures since there is a tendency for the closure tabs to be opened by the negative pressure and the application of the necessary sealing material to the closures is hindered by the vacuum applied to the underside of the can ends. Attempts have been made to modify the above vacuum system to reduce the adverse effects on push-in can ends but such attempts have thus far been only partially successful.

SUMMARY OF THE INVENTION

It is the object of the present invention to provide an alternative retention system for transfer equipment which at least substantially reduces the problems associated with the vacuum system described above. While the transfer system outlined above is linear in operation, the invention is equally applicable to rotary and other non-linear transfer systems. Similarly, the invention, while being particularly applicable to the transfer of can ends, is equally applicable to other articles which are required to be presented at one or more positions in a particular orientation.

While the problems associated with the vacuum system described above could be overcome by the provision of mechanical holding means attached to the indexing belt and engaging each can end to maintain its position in relation to the belt, such an arrangement requires a major modification to the transfer system and would be likely to have high servicing requirements as a result of the need for mechanisms for engaging and disengaging the mechanical means from the can ends on the belt.

The use of ribbon belts overlying the can ends and synchronously driven with the indexing belt was also discarded as being mechanically complex and because of the hindrance to die station access caused thereby. Consideration was also given to the use of jets of air impinging on the tops of the can ends but such an arrangement was discarded as being not particularly practical and as suffering from several of the shortcomings of the vacuum system.

In accordance with the present invention there is provided a system for retaining articles in a predetermined orientation in a transfer apparatus having means for carrying articles from one position to another, said system including means for contacting said articles supported by said carrying means, said contacting means being fixed relative to the motion of said carrying means in the direction of transfer of said articles, and means for causing application of a force between said articles, said contacting means and said carrying means to hold said articles in said predetermined orientation on said carrying means.

In one preferred form of the invention, the contacting means is biased into engagement with the articles supported by said carrying means while in another preferred form, the carrying means is biased towards the contacting means to cause engagement between the articles and the contacting means.

Where the articles being carried by the transfer equipment are identical in shape, whether circular, rectangular or otherwise, the contacting means may comprise a pair of contacting means, one on either side of the carrying means. For example, where the transfer equipment is a belt transfer apparatus for can ends of the type described above, the pair of contacting means are arranged in overlying relationship with the edge portions of the indexing belt so as to contact the top edge portions of the can ends carried by said indexing belt. In the first embodiment described above, the contacting means may comprise strips of spring steel attached to side rails attached to or forming part of the bearing means under the indexing belt and arranged to move vertically with the belt as each press operation is performed on the can ends. In this way, the force applied to each can end to maintain it in position relative to the belt is maintained throughout the entire passage of the can ends through the various stages of manufacture.

In the case of the second embodiment described above, the biasing force is applied by a series of spring loaded rollers arranged under each edge portion of the belt and normally biasing the belt and the can end carried thereby into contact with a pair of rails arranged in overlying relationship with the edge portions of the belt. The rails may have a low friction contact face where the can ends engage the rail to reduce the resistance to passage of the belt and the ends through the restraining means. In this embodiment, during each die operation the article and belt are pushed downwardly into the lower die station and during this period a restraining mechanism in the upper die station maintains the relative position of the end to the belt.

It will be appreciated that during passage of the carrying means and articles through the article retention system friction will occur between the articles and the contacting means. It has been found that an applied force between the contacting means and the article of the order of 200–500 grams is sufficient to retain articles such as can ends in position on the carrying means and that the application of such a force creates an amount of drag which is substantially inconsequential when regard is had to the drag forces normally occurring in transfer systems of this type. It is of course well known that the frictional forces involved in sliding motion are considerably less than static friction forces of the type which exist between the article and the carrying means of the transfer system. This is particularly so in the case of a can end which has a relatively sharp edge which contacts the supporting face of the indexing belt referred to above.

BRIEF DESCRIPTION OF DRAWINGS

The two preferred embodiments of the invention briefly described above will now be described in greater detail with reference to the accompanying drawings in which:

FIG. 1 is a partly fragmentary schematic sectional view of a can end transfer system incorporating an article retention system according to the present invention, FIG. 2 is a fragmentary sectional end elevation of the system of FIG. 1, and FIGS. 3 and 4 are views similar to FIGS. 1 and 2 showing a modified form of the invention.

DESCRIPTION OF PREFERRED EMBODIMENTS

Referring firstly to FIGS. 1 and 2 of the drawings, a Stolle-type can end transferring apparatus (see for example U.S. Pat. No. 3,231,065) is shown schematically to include an indexing belt 1 supported by a spaced pair of bearing rails 2 including bearing faces over which the indexing belt 1 slides as it is driven through the various die stages of the can end reforming operation. In the modification according to the embodiment of the present invention, the bearing rails 2 are laterally extended at 3 to provide a supporting means for a pair of spaced stainless spring steel strips 4 which are suitably secured, for example by screws or any other suitable means (not shown) to the extensions 3. The modified bearing rails 2, 3 are resiliently supported on the frame F of the transfer apparatus by a series of springs 5 so that the bearing rails 2, 3 are able to move vertically with the indexing belt 1 as each upper die station used in the reforming process engages the can end and forces it into engagement with the fixed lower die stations arranged under the belt 1. When the upper die station is retracted, the springs 5 return the rails 2, 3 and the trapped indexing belt 1 and the supported can ends to the transfer position. It will be appreciated that the rails 2, 3 may be returned by mechanical, electrical or hydraulic means although the springs 5 constitute a particularly simple returning means.

In order to prevent tilting or sideways movement of the rails 2, 3 the rails may be tied together by tie bars or links (not shown) or may be supported by vertical guide posts which restrain all but vertical movement of the rails 2, 3.

It will be appreciated that the width of the strips 4 is selected so that the upper die station may freely engage the upper surface of each can end as the can ends are indexed to the respective die stations by the indexing belt 1. The spring properties of the strips 4 are selected so that the force applied to the upper surfaces of the can ends engaged by the strips 4 is of the order 200-500 grams. Although lower forces may be used to maintain the orientation of the can ends with respect of the belt 1, it has been found that a force lying within the above range is satisfactory and does not significantly increase the drag forces applied to the indexing belt 1. To further reduce drag forces, at least the lower surfaces of the strips 4 are preferably hard chrome plated or are otherwise coated with some suitable low friction material.

The strips 4 are arranged to extend from a position in advance of the first die station to a position at least coincident with the last die station to ensure that the can ends are maintained in the desired orientation throughout the length of the reforming and sealant application processes. To assist in the introduction of the can ends under the strips 4 at the leading end of the retention means, the leading corners of the strips are slightly upturned as shown in FIG. 1.

In the modification shown in FIGS. 3 and 4 of the drawings, the can end contacting means comprises a pair of parallel side rails 6 which are rigidly fixed to the frame F of the transfer mechanism and have flange portions 7 which overlie the edge portions of the indexing belt 1. Alternatively, the flange portion 7 may be provided by the usual cover strip fitted to Stolle transfer equipment. The edge portion of each flange portion 7 has a low friction contact strip 8 attached to its lower face and which engages the rims of the can ends carried by the indexing belt 1.

A series of spring loaded rollers 9 engage the lower face of the indexing belt 1 on either side of the position occupied by each aperture in the indexing belt at each die station. The rollers 9 bias the belt 1 and the can ends carried thereby into engagement with the low friction strips 8 attached to the flanges 7 of the side rails 6. In this way, the required force is applied to the rims of the can ends to ensure that they are maintained in the required orientation throughout the reforming and sealant application operations.

It will be appreciated that when the upper die station displaces the can ends and the indexing belt 1 to the level of the lower die station, the rollers 9 will move downwardly with the indexing belt to be returned by the spring loading of the rollers 9 as the upper die station is retracted. During this period, the can ends are not restrained by the flanges 7 although the upper die stations incorporate a restraining mechanism which fixes the position of the can end as soon as the upper die station first contacts the can end.

The spring loading applied to each roller 9 is selected so that a force within the range stated above is applied to the rims of the can ends by the flanges 7. Once again, while lower forces may be used with similar success, forces falling within the above range do not appreciably increase the drag applied to the indexing belt 1 and are therefore preferred to ensure that the can ends to not move relatively to the indexing belt 1 during the reforming and sealant applying stages.

In each of the above embodiments, a particularly simple system for retaining articles in a predetermined orientation with respect to a carrier means is provided. In each case, the operation of the carrier is substantially the same as the operation prior to the incorporation of the retention system and the servicing requirements of each embodiment would be considerably less than the equivalent servicing requirements of other retention systems such as the vacuum system described in greater detail above.

It will be noted that the usual cover strips or upper limit members usually provided in 'Stolle' transfer equipment (see for example item 32 in U.S. Pat. No. 4,213,324) have not been shown in the drawings since it is believed that the strips 4 or rails 6 should satisfactorily restrict undesirable vertical movement of the can ends as the upper press tool is withdrawn after each operation. However, if for example it is found that the strips 4 do not sufficiently restrict such upward movement of the ends, suitable cover strips may be arranged in the usual manner over the strips 4.

Those conversant with 'Stolle' equipment will appreciate that while the drawings of U.S. Pat. No. 4,213,324 show the can ends apparently in contact with the limit members 32, standard operating procedure requires that the ends should run with a clearance under these members.

We claim:

1. A system for transporting can ends in a predetermined orientation through a plurality of can end reforming stations, said system comprising:

carrying means, including a movable member for supporting said can ends, for moving can ends supported on said movable member from one position to another, said movable member having spacing means for positioning said can ends in predetermined spaced apart relationship and substantially preventing longitudinal and lateral movement of said can ends relative to said movable member; and orientation maintaining means for preventing a change in orientation of said can ends on said movable member as said can ends move through said plurality of can end reforming stations, said orientation maintaining means comprising a pair of resilient strips biased into engagement with opposite edge portions of said can ends on said movable member, said strips being spaced sufficiently to facilitate the passage of reforming dies into engagement with said can ends, said strips being fixed relative to the motion of said carrying means and to the motion of said can ends, said strips applying a force to said can ends to hold said can ends on said movable member between said strips and said movable member during movement from said one position to another and prevent reorientation of said can ends during said movement.

2. The system as claimed in claim 1, wherein said strips are made from spring steel having at least those portions in contact with said can ends coated with a low friction material, said spring steel being selected to apply a force of 200–500 grams to said edge portions, said strips being attached to side rails fixed to bearing means supporting the movable member of said carrying means.

3. The system as claimed in claim 2, wherein said movable member comprises a linear indexing belt, said spacing means comprising a plurality of apertures, receivably engageable of said can ends, formed in said belt, and said strips extend from a position upstream of the first reforming station through which the can ends are passed to a position at least in line with the last reforming station through which said can ends are carried.

* * * * *